(12) United States Patent
Whitlow et al.

(10) Patent No.: US 10,596,503 B1
(45) Date of Patent: Mar. 24, 2020

(54) METAL SEAL WITH AN INTEGRAL FILTER

(71) Applicant: Technetics Group LLC, Charlotte, NC (US)

(72) Inventors: Mark Whitlow, Columbia, SC (US); Angus McFadden, Felton, CA (US); Kamal Frikach, Port Orange, FL (US); Elaine Motyka, Port Orange, FL (US); Jason Wright, San Mateo, CA (US)

(73) Assignee: TECHNETICS GROUP LLC, Charlotte, NC (US)

( * ) Notice: Subject to any disclaimer, the term of this patent is extended or adjusted under 35 U.S.C. 154(b) by 150 days.

(21) Appl. No.: 15/845,105

(22) Filed: Dec. 18, 2017

Related U.S. Application Data

(60) Provisional application No. 62/436,320, filed on Dec. 19, 2016.

(51) Int. Cl.
*B01D 46/00* (2006.01)
*B01D 46/10* (2006.01)
*F16J 15/08* (2006.01)

(52) U.S. Cl.
CPC ......... *B01D 46/0005* (2013.01); *B01D 46/10* (2013.01); *F16J 15/0887* (2013.01); *B01D 2201/0415* (2013.01); *B01D 2201/347* (2013.01); *B01D 2265/04* (2013.01); *B01D 2265/06* (2013.01); *B01D 2271/027* (2013.01)

(58) Field of Classification Search
CPC .............. B01D 46/0005; B01D 46/10; B01D 2201/0415; B01D 2265/04; B01D 2271/027; F16J 15/0887
See application file for complete search history.

(56) References Cited

U.S. PATENT DOCUMENTS

| | | | |
|---|---|---|---|
| 3,715,870 A * | 2/1973 | Guzick | B01D 29/01 55/466 |
| 4,263,140 A * | 4/1981 | Wujnovich | B01D 29/07 210/247 |
| 4,523,937 A * | 6/1985 | Brubaker | B01D 46/10 55/491 |
| 5,545,242 A | 8/1996 | Whitlock et al. | |
| 6,659,131 B2 | 12/2003 | Tsourides | |
| 7,264,643 B2 * | 9/2007 | Williams | F01N 3/027 55/282.3 |
| 7,410,519 B1 | 8/2008 | Ewald | |
| 7,438,864 B2 * | 10/2008 | Murphy | B01D 39/06 422/168 |
| 7,879,141 B2 * | 2/2011 | Zanni | B01D 53/0446 55/511 |

(Continued)

*Primary Examiner* — Eugene G Byrd
(74) *Attorney, Agent, or Firm* — Perkins Coie LLP

(57) ABSTRACT

The technology of the present application provides an apparatus for sealing and filtering. The apparatus includes a sealing component and a filtering component. The sealing component has an annular structure and a first connecting component. The annular structure includes a sidewall defining a recess. The first connecting component extends from the annular structure in a first direction. The filtering component has a filtering material and a second connecting component. The filtering material has a flat structure. The filter material is configured to filter fluid passing therein in a second direction. The sealing component and the filtering component are coupled by the first connecting component and the second connecting component.

19 Claims, 12 Drawing Sheets

(56) References Cited

U.S. PATENT DOCUMENTS

| | | | | |
|---|---|---|---|---|
| 9,061,227 | B2 * | 6/2015 | Palermo | B01D 46/0005 |
| 2002/0158006 | A1 * | 10/2002 | Thomas | B01D 29/21 |
| | | | | 210/440 |
| 2004/0035480 | A1 | 2/2004 | Tsourides | |
| 2011/0084016 | A1 * | 4/2011 | Le Roux | B01D 35/153 |
| | | | | 210/441 |
| 2014/0106397 | A1 * | 4/2014 | Rajagopal | B01L 3/5021 |
| | | | | 435/34 |
| 2015/0204325 | A1 | 7/2015 | Ishii et al. | |
| 2016/0160816 | A1 * | 6/2016 | Venkatraman | F02M 35/0209 |
| | | | | 55/502 |
| 2018/0361295 | A1 * | 12/2018 | Legare | A62B 18/006 |
| 2019/0046909 | A1 * | 2/2019 | Haas | B01D 46/0002 |

* cited by examiner

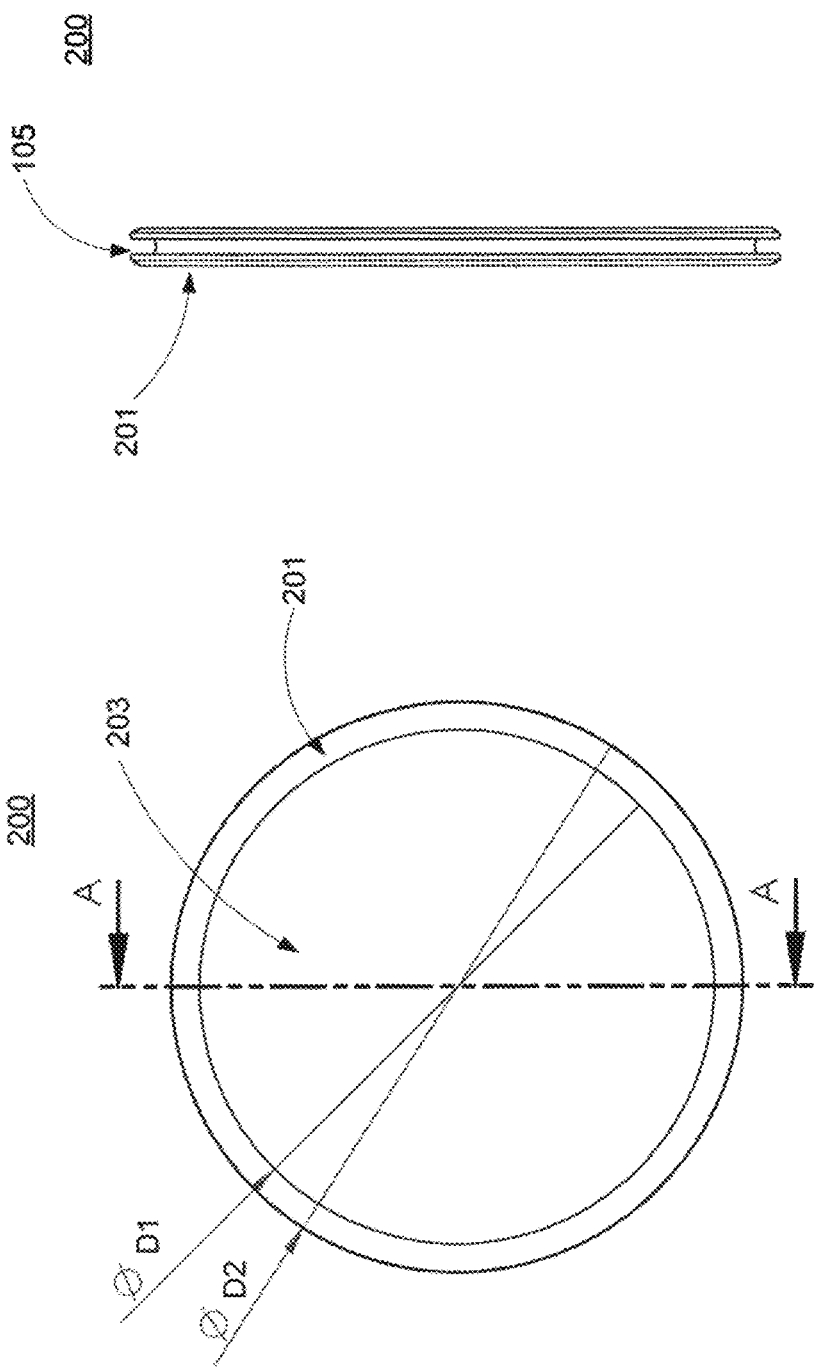

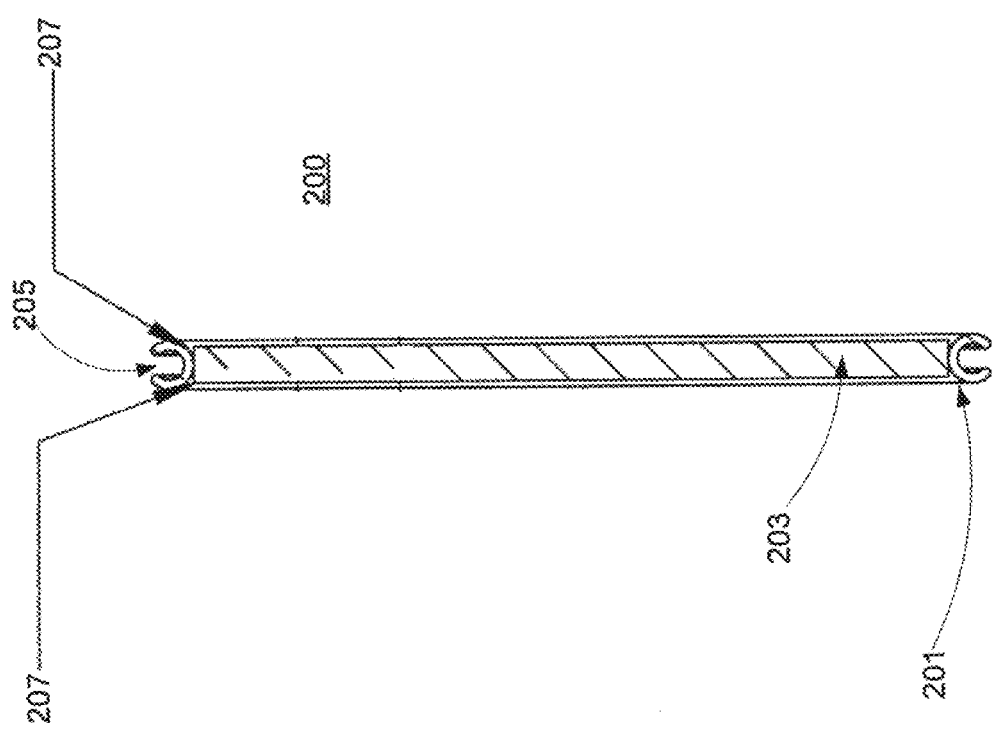

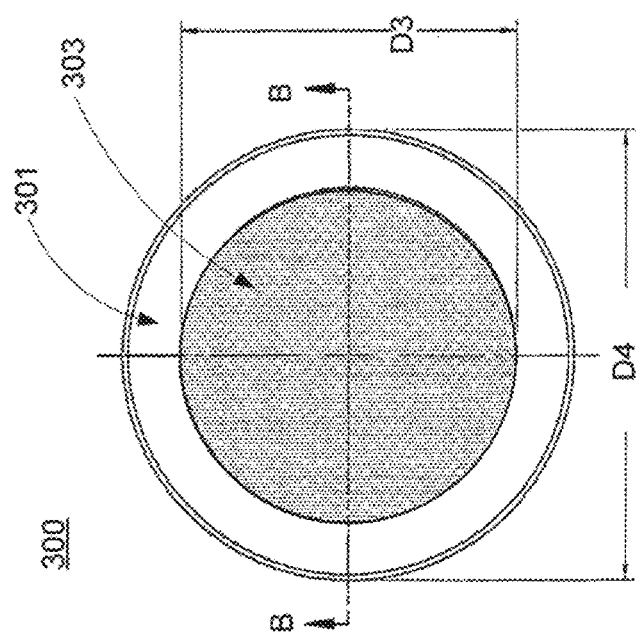

FIG. 9
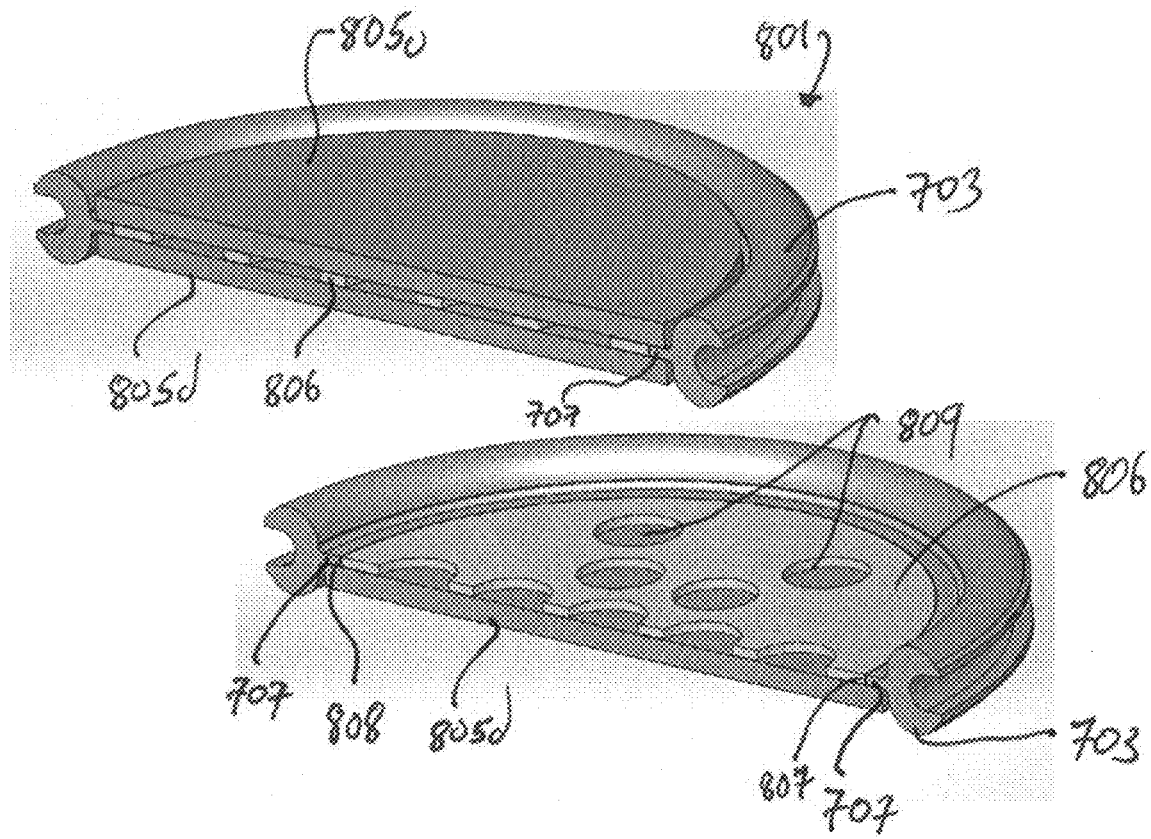
FIG. 10
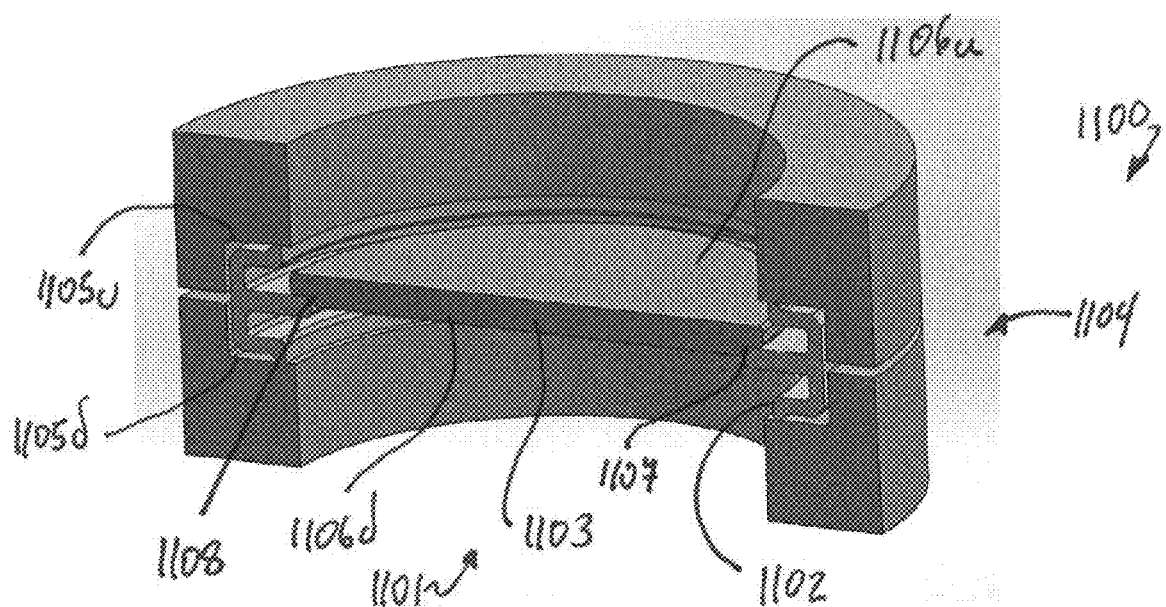
FIG. 11

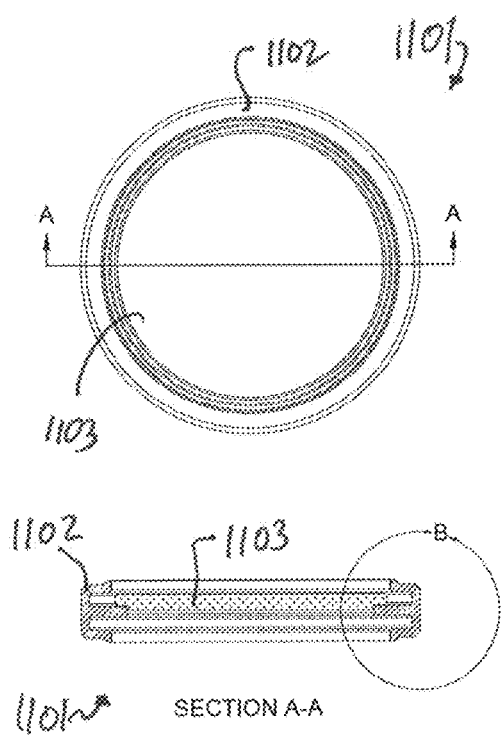
FIG. 12A
FIG. 12B
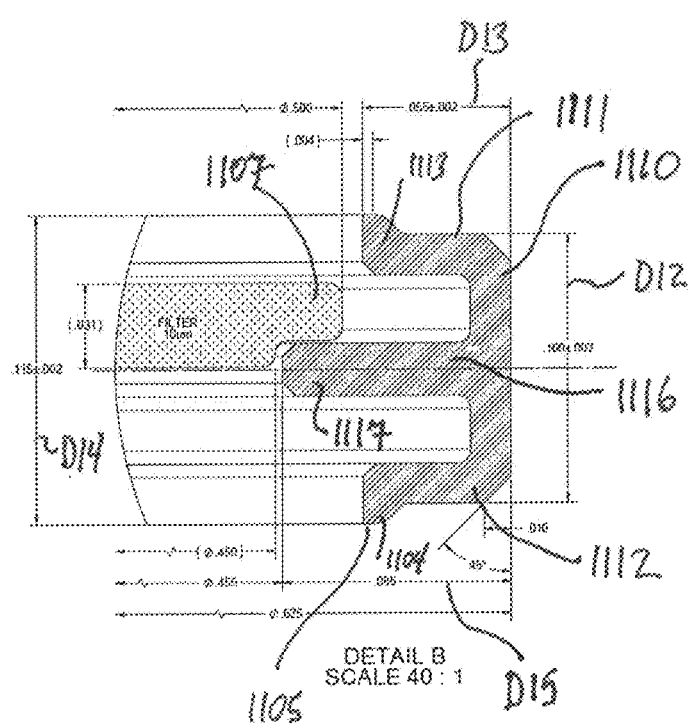
FIG. 13

METAL SEAL WITH AN INTEGRAL FILTER

CROSS-REFERENCE TO RELATED PATENT APPLICATIONS

The present application claims priority to U.S. Provisional Patent Application Ser. No. 62/436,320, filed Dec. 19, 2016, the disclosure of which is incorporated herein by reference as if set out in full.

TECHNICAL FIELD

The present application relates to an apparatus for filtering and sealing. More particularly, the present application relates to metal seal with an integral filter element forming a monolithic unit.

BACKGROUND

A metal seal generally comprises a ringed metal where the metal is formed into a spring shape, such as, for example, a C or E shape. The metal seal is placed into a joint and compressed. The spring shape of the metal seal, such as the C shape for example, causes the upper and lower sealing components of the metal seal to press against opposed surfaces of the joint, forming a seal.

A conventional metal seal does not have a filtering function. To perform such a function, a user may need to couple a conventional metal seal to a separate filter, which can be cumbersome, inefficient and may require a skilled technician to properly complete the installation task. Additionally, the coupling a conventional metal seal to a separate filter component generally results in a higher profile for the device due to the stacked nature. Improper installation may result in fluid, including both liquid and gas, leakage, low efficiency of filtering, malfunctions, and/or even damages to related components. Therefore, it is advantageous to have an improved apparatus that can properly perform filtering and sealing tasks at the same time. The improved apparatus that performs filtering and sealing tasks should, additionally, have a lower profile than conventional devices.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In certain embodiments, the technology of the present application provides an apparatus for filtering and sealing, such as metal seal with an integral filter. The apparatus includes a sealing component having an annular structure. The annular structure has a sidewall defining a recess. When the sidewalls are placed in compression, they elastically compress to reduce the size of the recess and press against the opposed joint surfaces to form a seal interface between the seal arms of the metal seal ad the surfaces of the joint or flange. The apparatus includes a first connecting component and a second connecting component. The second connecting component is positioned/configured to couple to the first connecting component. The first connecting component extends from the annular structure in a first direction. The apparatus also includes a filtering component having a filtering material. The filtering material has a flat structure extending substantially along a plane. The axial profile of the filtering material has a thickness that is generally less that the thickness of the compressed metal seal. The filter material is positioned/configured to filter fluid, which may be both liquid or gas, passing therein in a second direction. The second connection components is coupled to the filtering component and extends from the filtering component in a second direction. The sealing component and the filtering component are coupled by the first connecting component and the second connecting component.

These and other aspects of the present apparatus will be apparent after consideration of the Detailed Description and Figures herein.

DRAWINGS

Non-limiting and non-exhaustive embodiments of the technology of the present application, including the preferred embodiment, are described with reference to the following figures, wherein like reference numerals refer to like parts throughout the various views unless otherwise specified.

FIG. 2A depicts a top view of an apparatus consistent with the embodiments of the present application.

FIG. 2B depicts a side view of the apparatus illustrated in FIG. 2A.

FIG. 2C depicts a cross-sectional view (Section A-A) of the apparatus illustrated in FIG. 2A.

FIG. 3A depicts a top view of an apparatus consistent with the embodiments of the present application.

FIG. 9 depicts a partial perspective view of the apparatus of FIG. 8 consistent with the embodiments of the present application.

FIG. 10 depicts a partial perspective view of the apparatus of FIG. 9 consistent with the embodiments of the present application.

FIG. 11 depicts a partial perspective view of an apparatus consistent with the embodiments of the present application.

FIGS. 12A, 12B depict a plan view and a cross-sectional view an apparatus consistent with the embodiments of the present application.

FIG. 13 depicts a detail from FIG. 12B.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the exemplary embodiments set forth herein. The following detailed description is, therefore, not to be taken in a limiting sense. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary. Certain of the figures contained herein provide dimensions or the like, which dimensions should be considered exemplary and not limiting.

Figure 1:
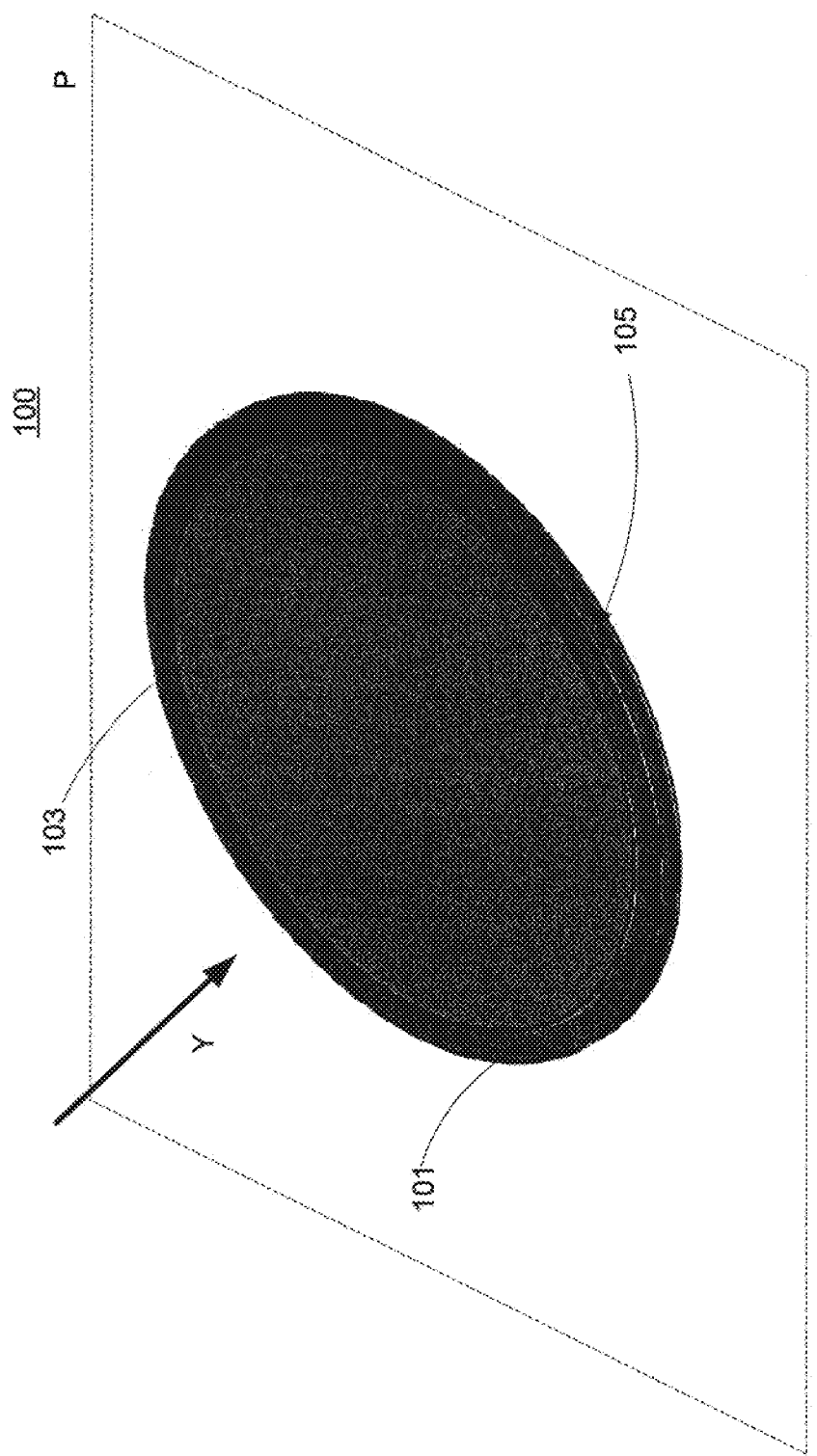
FIG. 1 depicts an isometric view of an apparatus consistent with the embodiments of the present application.

With reference to FIG. 1, an isometric view of an apparatus 100 consistent with the embodiments of the present application is provided. The apparatus 100 includes a sealing component 101 and a filtering component 103 coupled to the sealing component 101. The sealing component 101 includes an annular structure. Optionally, in certain embodiments, the annular structure may be configured to accommodate an annular spring (not shown in FIG. 1). Also, the apparatus 100 may be shaped to fit most joint structures, although annular is the most common. The filtering component 103 includes a filtering material configured to filter fluid, which fluids may include either liquids or gases, passing therethrough in direction Y, which is sometimes referred to as a second direction. The filtering component 103 includes a flat structure that extends substantially along a reference plane P. The sealing component 101 defines a recess 105 (or a gland, a cavity, etc.). Optionally, the sealing component 101 may be formed such that the recess 105 can accommodate an O-ring, an energized spring, or the like (not shown in FIG. 1). In other aspects of the technology, the shape of the sealing component along with the material may provide sufficient spring energy that an energized spring in the recess 105 is not required. The sealing components 101, 201, 301, 401, 501, 601 described herein may be configured to use an energized spring or not. In some embodiments, the sealing component 101 includes one or more sidewalls (e.g., sidewalls 3051, 4051, 5051 or 6051 as discussed in detail below) so as to define the recess 105. Embodiments of the recess 105 will be discussed in detail below with reference to FIGS. 3B, 3C, 4, 5 and 6. The recess 105 (as well as other recesses) may be substantially open as the C shaped metal seals shown in certain figures. However, in other embodiments, the recess 105 may have members extending into the recess 105.

FIG. 2A depicts a top view of an apparatus 200 consistent with the embodiments of the present application. As shown, the apparatus 200 includes a sealing component 201 and a filtering component 203 coupled to the sealing component 201. As shown, the sealing component 201 includes an inner diameter D1 and an outer diameter D2. The filtering component 203 includes a diameter substantially equal to the inner diameter D1 of the sealing component 201, such that the sealing component 201 and the filtering component 203 can be coupled closely or seamlessly.

FIG. 2B depicts a side view of the apparatus 200 illustrated in FIG. 2A. As shown, the sealing component 201 defines a recess 105, which optionally may be configured to accommodate a spring such as an energized spring (not shown in FIG. 2B). FIG. 2C depicts a cross-sectional view (Section A-A) of the apparatus 200. As shown in FIG. 2C, the sealing component 201 and the filtering component 203 are coupled together by a connecting component 207. In the illustrated embodiment, the connecting component 207 includes a weld. In some embodiments, the connecting component 207 can be made of a material the same as (or similar to) the material of the sealing component 201. In some embodiments, the connecting component 207 can be made of a material the same as (or similar to) the material of the filtering component 203. In some embodiments, the connecting component 207 can further include a first connecting component extending from the sealing component 201 and a second connecting component extending from the filtering component 203. The first connecting component and the second connecting component are closely, and possibly seamlessly, coupled such that the sealing component 201 and the filtering component 203 are closely, and possibly seamlessly, coupled. In some embodiments, the sealing component 201, the filtering component 203 and the connecting component 207 can be integrally formed. Additionally, as can be appreciated by the cross-sectional view of FIG. 2C, the thickness of the filtering component 203 is less than the thickness of the sealing component 201 at the sealing arms facilitating the low profile nature of the combined construct of the present application.

FIG. 3A depicts a top view of an apparatus 300 consistent with the embodiments of the present application. As shown, the apparatus 300 includes a sealing component 301 and a filtering component 303 coupled to the sealing component 301. As shown, the sealing component 301 has an outer diameter D4, and the filtering component 303 has an outer diameter D3 smaller than D4. The outer diameter D3 of the filtering component 303 can be the same as or substantially equal to the inner diameter of the sealing component 301, such that the sealing component 301 and the filtering component 303 can be coupled closely or seamlessly.

Figure 3B:
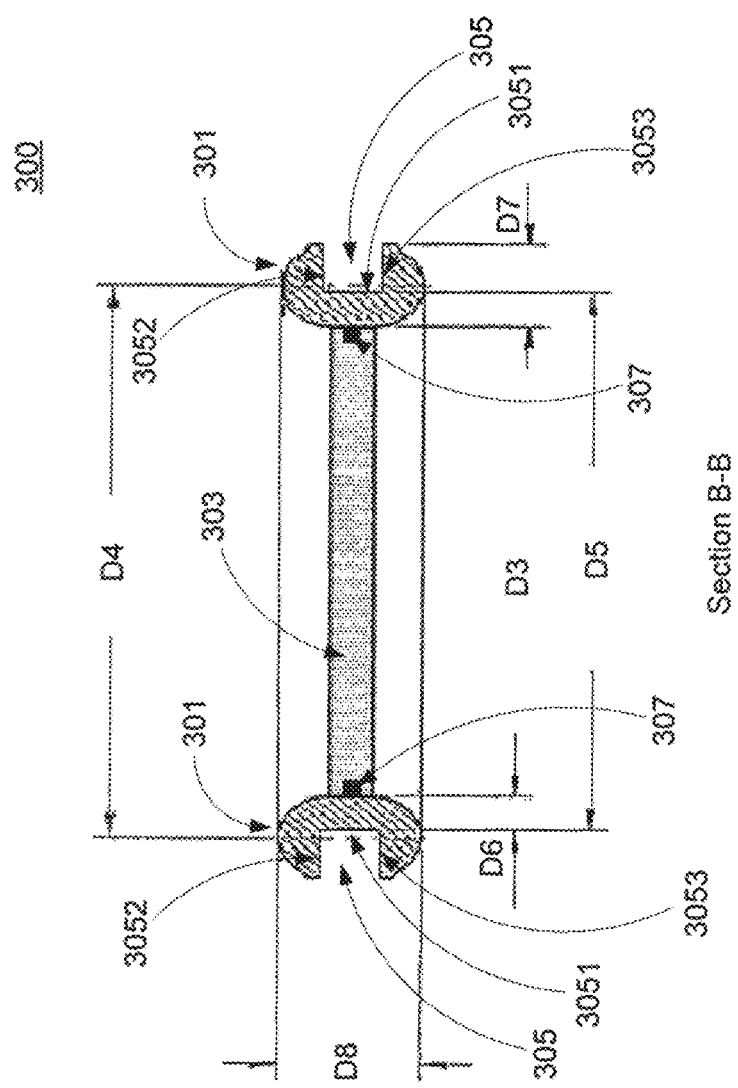
FIG. 3B depicts a cross-sectional view (Section B-B) of the apparatus illustrated in FIG. 3A.
Figure 3C:
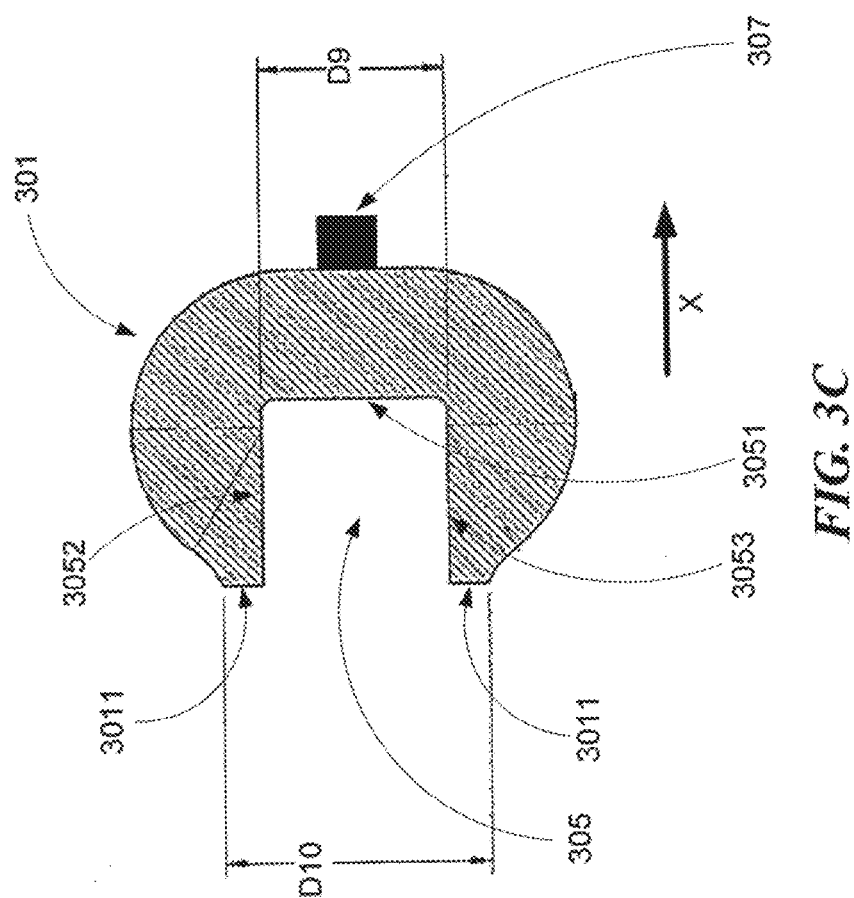
FIG. 3C depicts a partial cross-sectional view of a sealing component consistent with the embodiments of the present application.

FIGS. 3B and 3C depict cross-sectional views (Section B-B) of the apparatus 300 and the sealing component 301 illustrated in FIG. 3A. As shown in FIG. 3B, the sealing component 301 defines a recess 305. In the illustrated embodiment, the sealing component 301 and the filtering component 303 are coupled together by a connecting component 307. In the illustrated embodiment, the connecting component 307 includes a weld extending from an inwardly-facing surface of the sealing component 301 (in direction X, as shown in FIG. 3C, which is sometimes referred to as a first direction). The connecting component 307 is coupled to the filtering component 303. In some embodiments, the connecting component 307 can be made of a material the same as (or similar to) the material of the sealing component 301. In some embodiments, the connecting component 307 can be made of a material the same as (or similar to) the material of the filtering component 303. In some embodiments, the connecting component 307 can further include a first connecting component extending from the sealing component 301 and a second connecting component extending from the filtering component 303. Extending, in context, may include a protrusion from one and a recess from another to form tongue and groove connections as well as multiple connected protrusions or the like. The first connecting component and the second connecting component are closely, and possibly seamlessly, coupled such that the sealing component 301 and the filtering component 303 are closely, and possibly seamlessly, coupled. In some embodiments, the sealing component 301, the filtering component 303 and the connecting component 307 are integrally formed.

As shown in FIGS. 3B and 3C, the recess 305 can be defined by a vertical sidewall 3051 and two horizontal sidewalls 3052, 3053, sometimes referred to collectively as sidewalls. In the illustrated embodiment, the horizontal distance between two vertical sidewalls 3051 is defined as D5, which is smaller than the outer diameter D4 and greater than the inner diameter D3. Notice the outer diameter D4 is generally indicated as the diameter of the sealing interface, but could be the outer diameter at the opposed tips of the metal seal. A sidewall thickness from the vertical sidewall 3051 to the inwardly-facing surface of the sealing component 301 can be defined as D6, whereas an overall sectional thickness of the sealing component 301 can be defined as D7. As shown in FIG. 3B, the difference between D7 and D6 represents the depth of the recess 305. In some embodiments, the horizontal distance D5 can be greater than D4. The sealing component 301 has an overall vertical thickness D8, which is greater than the vertical length of the vertical sidewall 3051, which also is greater than the vertical length (or axial length) of the filtering component 303. In the illustrated embodiment, the vertical length D9 (FIG. 3C) of the vertical sidewall 3051 is greater than the vertical length of the connecting component 307. In some embodiments, the vertical length of the connecting component 307 can be greater than the vertical length D9 of the vertical sidewall 3051. In such embodiments, the vertical length of the connecting component 307 is smaller than the overall vertical thickness D8 of the sealing component 301.

As shown in FIG. 3C, the sealing component 301 includes a flat outer surface 3011. The flat out surface 3011 has a vertical length D10, which is greater than the vertical length D9 of the vertical sidewall 3051 but smaller than the overall vertical thickness D8.

Figure 4:
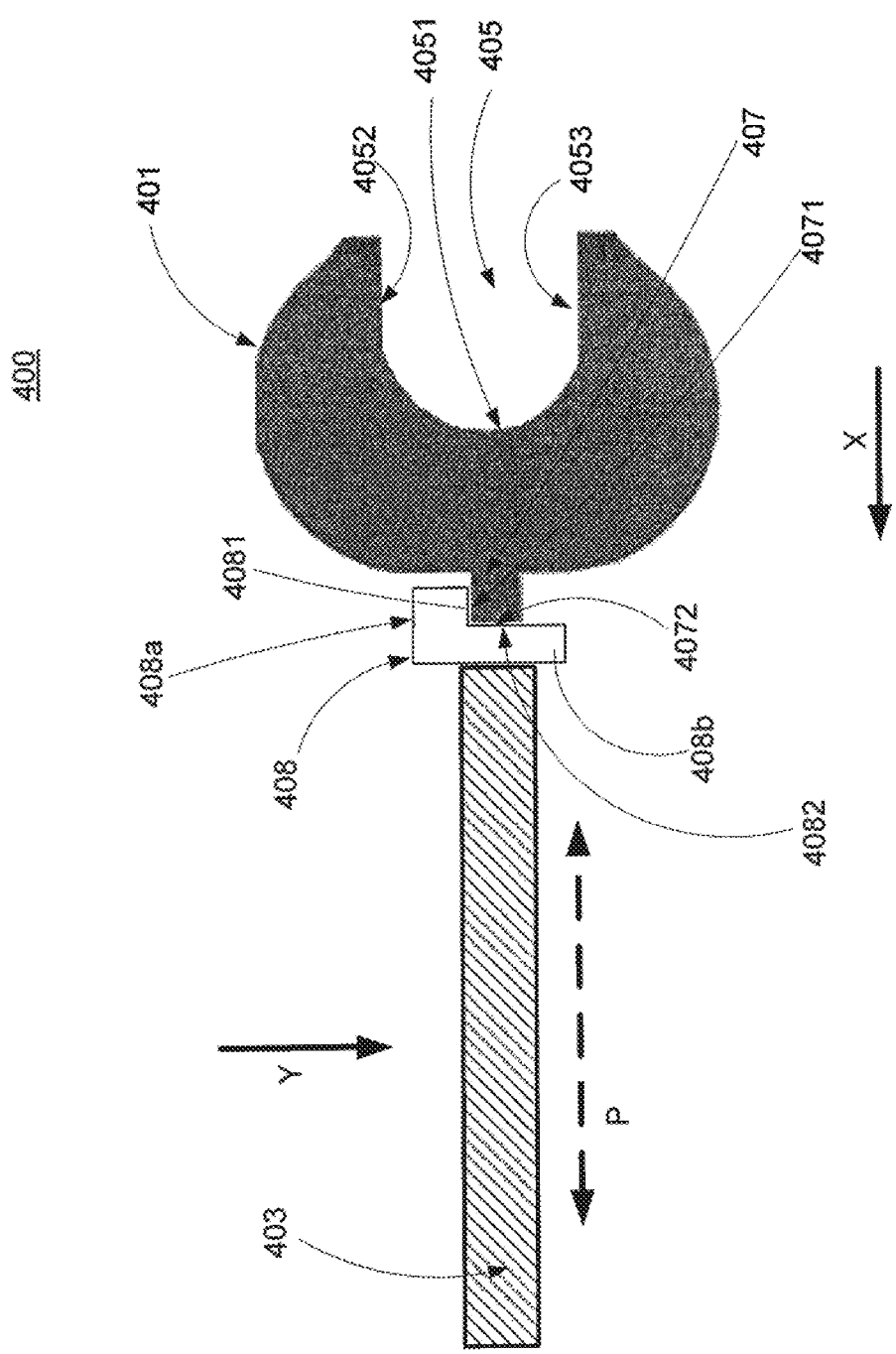
FIG. 4 depicts a partial cross-sectional view of an apparatus consistent with the embodiments of the present application.

FIG. 4 depicts a partial cross-sectional view of an apparatus 400 consistent with the embodiments of the present application. In FIG. 4, the apparatus 400 includes a sealing component 401 and a filtering component 403 coupled to the sealing component 401. The filtering component 403 includes a flat structure that extends substantially along a reference plane P. The sealing component 401 includes a recess 405. As shown, the recess 405 can be defined by a vertical sidewall 4051 and two horizontal sidewalls 4052, 4053. In the illustrated embodiment, the vertical sidewall 4051 includes a curved surface. In some embodiments, the vertical sidewall 4051 can include a patterned or contoured surface. As shown, a first connecting component 407 extends inwardly from the sealing component 401 in direction X, sometimes referred to as a first direction. In some embodiments, the first connecting component 407 includes a weld. The first connecting component 407 includes a first connecting surface 4071 and a second connecting surface 4072. In the illustrated embodiment, the first connecting surface 4071 is substantially perpendicular to the second connecting surface 4072. The first connecting component 407 couples to a second connecting component 408, which further couples to the filtering component 403.

The second connecting component 408 has a horizontal portion 408a having a horizontal surface 4081 and a vertical portion 408b having a vertical surface 4082. As shown in FIG. 4, the horizontal surface 4081 is in contact with the first connecting surface 4071 such that the filtering component 403 can be configured to filter or screen fluid passing through (e.g., in direction Y, sometimes referred to as a second direction). The vertical surface 4082 is in contact with the second connecting surface 4072 such that the filtering component 403 can axially support the sealing component 401. The sealing component 401 is compressed which pushes the sealing component 401 against the opposed joint surface to form a seal therebetween. The coupling between the first connecting component 407 and second connecting component 408 may be a weld or other adhesive connecting the surfaces 4081/4071 and 4082/4072. Vertical and horizontal are for orientation on the figure and should not be considered limiting. Installed, the vertical surfaces 8072/4082 may be considered to be axial surfaces and the horizontal surfaces 4071/4081 may be considered to be radial surfaces.

Figure 5:
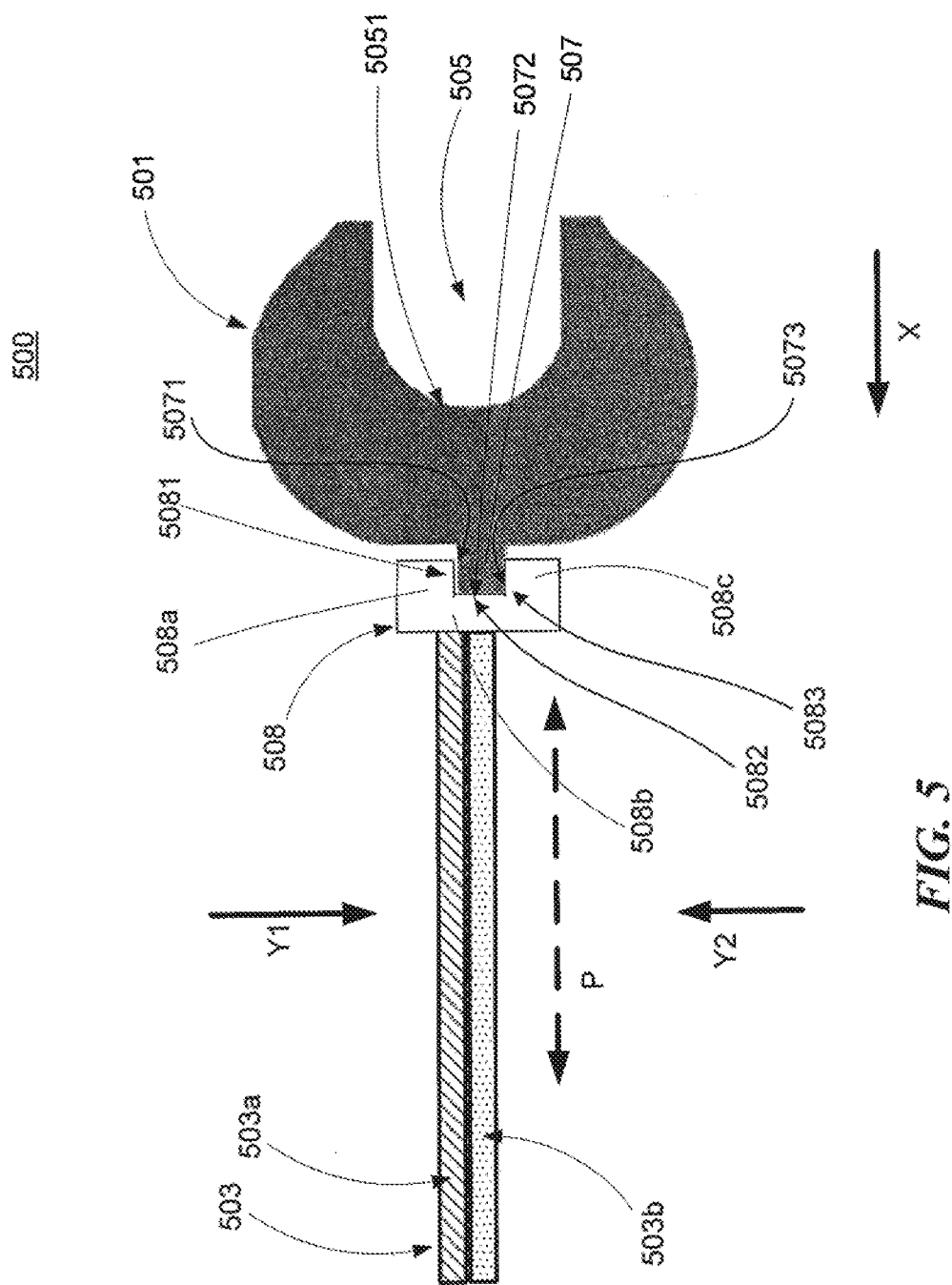
FIG. 5 depicts a partial cross-sectional view of an apparatus consistent with the embodiments of the present application.

FIG. 5 depicts a cross-sectional view of an apparatus 500 consistent with the embodiments of the present application. In FIG. 5, the apparatus 500 includes a sealing component 501 and a filtering component 503 coupled to the sealing component 501. The filtering component 503 includes a flat structure that extends substantially along a reference plane P. The filtering component 503 includes a first filter 503a and a second filter 503b. In some embodiments, the first filter 503a and the second filter 503b can include different filtering materials. In some embodiments, the first filter 503a and the second filter 503b can be made of the same filtering material. The sealing component 501 includes a recess 505. When the joint surfaces compress the sealing component 501, the recess can have one or more curved surfaces 5051 configured to urge the sealing component to seat against the joint surfaces forming a seal therebetween. The recess 505, optionally, can have a curved surface 5051 configured to accommodate a spring to augment the sealing force in certain embodiments.

As shown in FIG. 5, a first connecting component 507 extends inwardly from the sealing component 501 in direction X. In some embodiments, the first connecting component 507 includes a weld. The first connecting component 507, which may be a boss in certain embodiments, includes a first connecting surface 5071, a second connecting surface 5072, and a third connecting surface 5073. In the illustrated embodiment, the first connecting surface 5071 is substantially perpendicular to the second connecting surface 5072. The third connecting surface 5073 is also substantially perpendicular to the second connecting surface 5072. The first connecting surface 5071 and the third connecting surface 5073 are generally parallel. The first connecting component 507 couples to a second connecting component 508, which further couples to the filtering component 503.

The second connecting component 508, which may be a boss in certain embodiments, has a first horizontal portion 508a having a first horizontal surface 5081, a second horizontal portion 508c having a second horizontal surface 5083, and a vertical portion 508b a having a vertical surface 5082. For reference, horizontal surfaces generally signify radially extending surfaces and vertical surfaces generally signify axially extending surfaces. As shown in FIG. 5, the first horizontal surface 5081 is in contact with the first connecting surface 5071 such that the filtering component 503 can be configured to filter or screen fluid passing through in direction Y1. The second horizontal surface 5083 is in contact with the third connecting surface 5073 such that the filtering component 503 can be configured to filter or screen fluid passing through in direction Y2. The vertical surface 5082 is in contact with the second connecting surface 5072 such that the filtering component 503 can horizontally support the sealing component 501.

Figure 6:
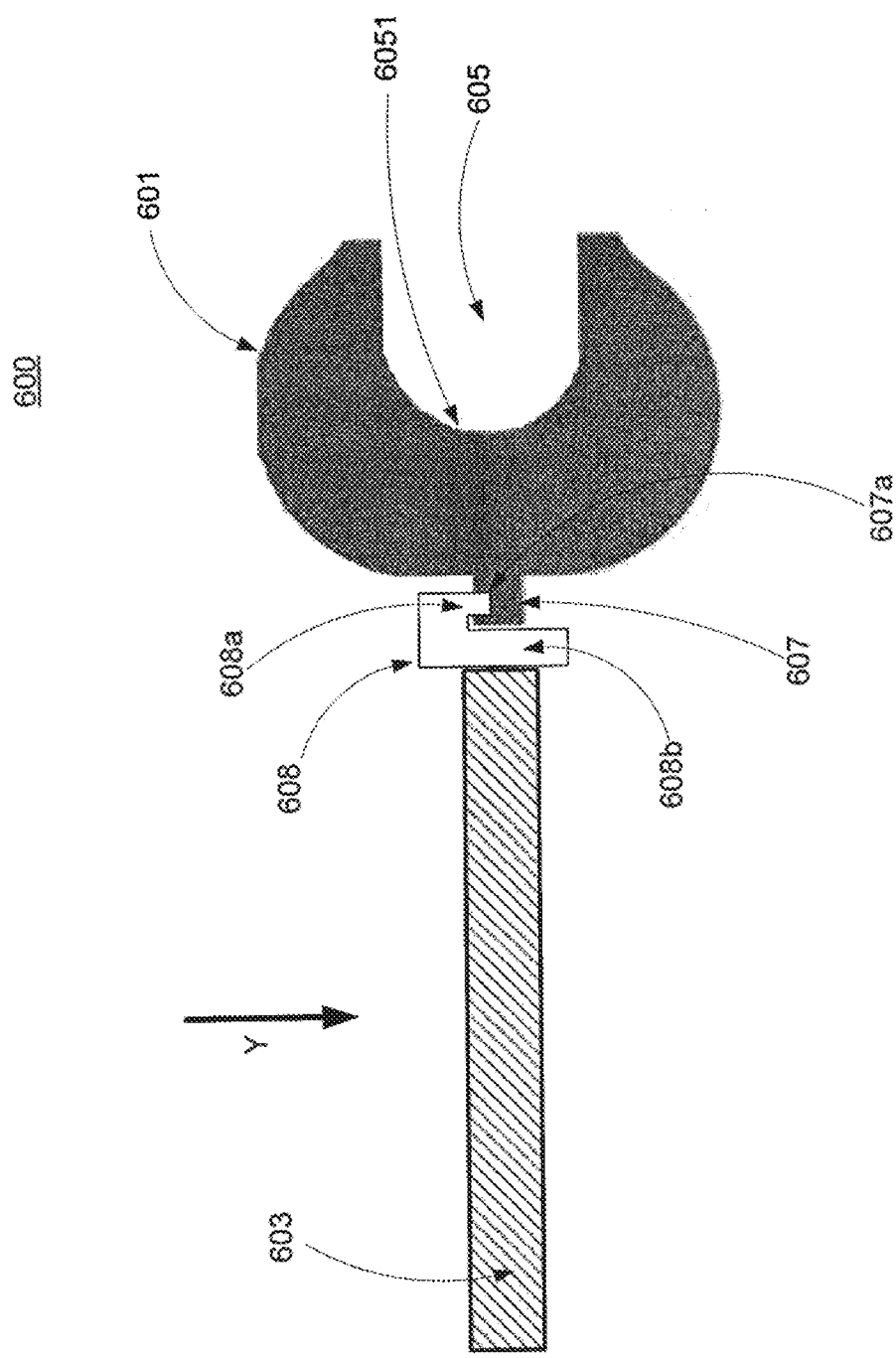
FIG. 6 depicts a partial cross-sectional view of an apparatus consistent with the embodiments of the present application.

FIG. 6 depicts a cross-sectional view of an apparatus 600 consistent with the embodiments of the present application.

In FIG. 6, the apparatus 600 includes a sealing component 601 and a filtering component 603 coupled to the sealing component 601 via a first connecting component 607 and a second connecting component 608. The sealing component 601 defines a gland 605 that may be configured to accommodate an energized spring inserted therein, although not specifically shown. As shown, the gland 605 can have a curved surface 6051 configured to accommodate the energized spring. As shown in FIG. 6, the first connecting component 607 extends radially inwardly from the sealing component 601. In some embodiments, the first connecting component 607 includes a weld. The first connecting component 607 includes a connecting recess 607a configured to accommodate a first portion 608a (sometimes referred to as a first protrusion 608a or protrusion 608a) of the second connecting component 608, which further couples to the filtering component 603 via a second portion 608b. As shown in FIG. 6, the first connecting component 607 and the second connecting component 608 are coupled such that the filtering component 603 can be configured to filter or screen fluid passing through in direction Y.

The above apparatuses are generally described with a first component coupled to the sealing component and the second component coupled to the filtering component. It can be appreciated, however, that the second component may be coupled to the sealing component and the first component may be coupled to the filtering component. As can be appreciated, coupling the first component and the second component as described above and below may be considered in certain embodiments to be a means for connecting the metal seal component and the filter component.

Figure 7:
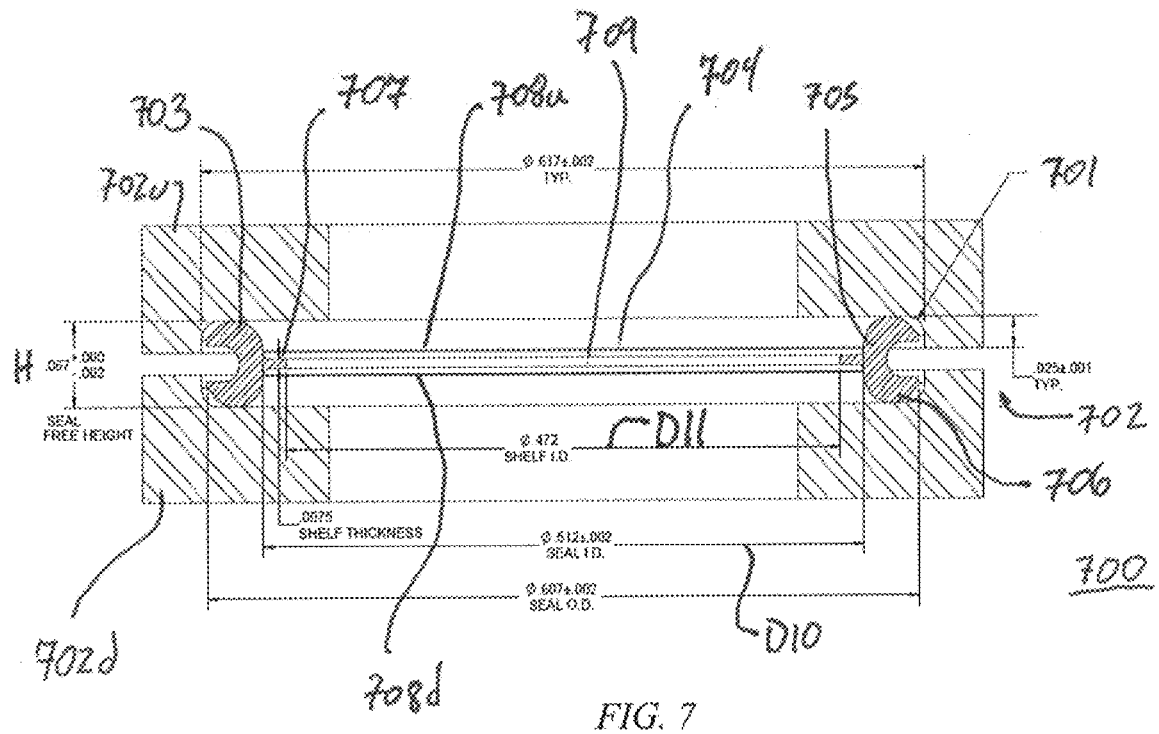
FIG. 7 depicts a cross-sectional view of an apparatus consistent with the embodiments of the present application.

FIGS. 1-6 above generally describe the metal seal with an integral filter using a formed C-shaped metal seal with a filter element attached to the inner diameter of the metal seal. FIGS. 7-13 provide an alternative embodiment of the technology where the metal seal is a machined metal seal with an integral filter. FIG. 7 shows a cross sectional view of a fluid system 700 having a machined metal seal with an integral filter 701 at a joint 702 in the fluid system 700. The joint 702 has an up stream part 702u and a downstream part 702d. The machined metal seal with an integral filter 701 has a machined metal seal part 703 and a filter part 704. The machined metal seal part 703 has an annular ring base 705 and a pair of opposed sealing arms 706 extending radially from the annular ring base 705.

The seal part 703 has a height of H. A ledge 707 is centered along the height on the annular ring base 705 and extends radially from the annular ring base 705 in a direction opposite from the sealing arms 706 and generally radially inwardly. The ledge 707 may be positioned more upstream or more downstream depending on system parameters. The annular ring base 705 has an inner diameter D10. The ledge 707 has an inner diameter D11 less than the diameter D10.

The filter part 704 includes an upstream ring 708u and a downstream ring 708d separated by a filter material 709 sandwiched between the upstream ring 708 and downstream ring 708d. The upstream ring 708u and the downstream ring 708d have outer diameters at least between D11 and D10, and as shown substantially the same as D10. The filter material 709 has an outer diameter substantially equal to D11. In certain embodiments, the upstream ring 708u and the downstream ring 708d can be replaced by a filter material formed in the shape of a wafer. In this case, a gap would exist at 709.

As can be appreciated, the ledge 707 forms the first connecting component and the upstream ring 708u, the downstream ring 708d, the filter material 709 form the second connecting component. The first and second connecting components are coupled using, for example, a weld or adhesive. In certain embodiments, the coupling of the first and second connecting components may be through a chemical bonding.

Figure 8:
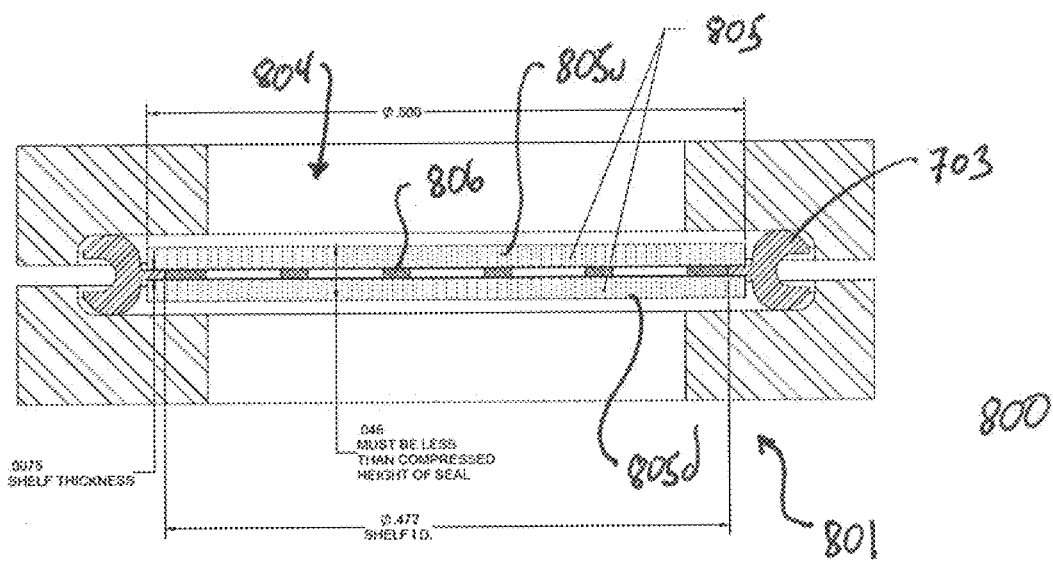
FIG. 8 depicts a cross-sectional view of an apparatus consistent with the embodiments of the present application.

FIG. 8 shows a cross section of a fluid system 800, which is similar to the embodiment of fluid system 700. Fluid system 800 includes a machined metal seal with an integral filter 801. The machined metal seal with an integral filter 801 includes a machined seal part 703 and a filter part 804. The machined seal part 703 is explained above. The filter part 804 includes a upstream filter material 805u and a downstream filter material 805d. A metal support 806 is sandwiched between upstream and downstream filter material 805u, 805d. The metal support 806 may be a perforated metal plate (as will be shown below) or a series of metal ribs.

FIGS. 9 and 10 show the machined metal seal with an integral filter 801 in a cross-sectional, perspective view. In FIG. 9, the upstream and downstream filter material 805u, 805d is shown. In FIG. 10, the upstream filter material 805u is removed to show the metal support 806. The metal support 806 has an edge 807 that may be coupled, via a weld or the like, to an edge 808 of the ledge 707. The metal support 806 may include perforations 809 to facilitate fluid flow, whether liquid or gas.

FIG. 11 shows another embodiment of a metal seal with an integral filter 1101 in a fluid system 1100. The metal seal with an integral filter 1101 has a metal seal component 1102 and a filter component 1103. In certain applications of the technology, described above, compression of the metal seal (whether formed or machined) caused radially inward movement of the seal's base. The movement may, in certain instances, create stress in the coupling of the first component and the second component described above, whether the coupling is via a weld, braze, epoxy, chemical bonding, or the like. At the very least, the movement may create a high stress area. Additionally, in certain fluid systems, the pressure on the filter component may reduce the seating force of the seal, which may decrease system performance. The metal seal with an integral filter 1101 may alleviate certain of the deficiencies notes above.

The metal seal with an integral filter 1101 is placed within a joint 1104 in the fluid system 1100, specially in a seal gland. The opposed upstream surface 1105u and downstream surface 1105d supply a compressive force (via bolts or the like) on the metal seal component 1102. The metal seal component 1102 in this exemplary embodiment has a generally E shape where the middle leg of the E is extended as compared to the upper and lower legs, as will be explained further below. The filter component 1103 has an upstream portion 1106u and a downstream portion 1106d. The upstream portion 1106u is slightly enlarged with respect to the downstream portion 1106d forming an annular ledge 1107. The transition surface 1108 from the upstream portion 1106u to the downstream portion 1106d may be a step transition, a ramp transition, a curved transition. The transition surface 1108 may be shaped to match the middle leg of the E.

FIGS. 12A and 12 B show a plan view and a cross-sectional view of the metal seal with an integral filter 1101. FIG. 13 shows a detail of the metal seal with an integral filter 1101. As shown best in FIG. 13, the metal seal with an integral filter 1101 includes the metal seal component 1102 and the filter component 1103. The metal seal component 1102 has an annular base 1110 having a height D12. The corners of the annular base 1110 may be chamfered to facilitate insertion into the seal gland. The metal seal component 1102 further has a first edge leg 1111 and a second edge leg 1112 that are at opposed ends of the annular base 1110. The first edge leg 1111 and the second edge leg 1112 extending radially inward a distance D13. The radially inward ends 1113 of the first edge leg 1111 and the second edge leg 1112 terminate in protrusions 1114 extending axially (as opposed to radially) outward to form sealing surfaces 1105. The distance between the sealing surfaces 1105 is D14, which is greater than D12. The metal seal component 1102 also comprises a middle leg 1116, situated approximately ½ along the annular base 1110 between the first edge leg 1111 and the second edge leg 1112, although the middle leg may be more upstream or downstream depending on system parameters. The middle leg 1116 extends radially inwardly a distance D15, which is greater than distance D13, such that a portion 1117 of the middle leg 1116 extends beyond the radially inward ends 1113.

FIG. 13 shows that the annular ledge 1107 of the filter component 1103 overlies a portion of the portion 1117 of the middle leg 1116. The portion 1117 corresponds to a first connecting component and the ledge 1107 corresponds to the second connecting component such that the metal seal with an integral filter 1101 can be formed by coupling the first connecting component and the second connecting component via welding, brazing, adhering, epoxying, chemical bonding, or the like.

Embodiments of the energized spring discussed herein can include, for example, those provided by the Technetics Group LLC, with offices in Columbia, S.C. In some embodiments, the sealing component discussed herein can include various shapes, such as C-shape, U-shape, V-shape, W-shape, E-shape, M-shape, etc. In certain embodiments, the sealing component may be formed of a resilient metal such as nickel alloys, stainless steel, etc. In other applications, the sealing component may be formed of plastics, composites, rubbers, or the like. In still other embodiments, the sealing component may be formed of a combination of metals and plastics. For example, a stainless steel V-shape metal sealing component may be coated with polytetrafluoroethylene (PTFE), perfluoroalkoxy (PFA), fluorinated ethylene propylene (FEP), ultra-high molecular weight polyethylene (UHMWPE), and perfluoroelastomers, to name but a few coatings that could be applied to a metal sealing component.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Because many embodiments of the invention can be practiced without departing from the spirit and scope of the invention, the invention resides in the claims hereinafter appended.

What is claimed is:

1. An apparatus for sealing and filtering, the apparatus comprising:
 a metallic sealing component having an annular structure and, the annular structure including a sidewall defining a recess and a pair of opposed sealing arms extending in a radial direction from the recess;
 a first connecting component extending from the annular structure in a first direction;
 a filtering component having a filtering material having a flat structure extending substantially along a plane, the filter material being configured to filter fluid passing therein in a second direction; and
 a second connecting component coupled to the filtering component and configured to be coupled to the first connecting component, the second connecting component extending in a third direction to overlap, in part, with the first connecting component;
 wherein the metallic sealing component and the filtering component are coupled by the first connecting component and the second connecting component to form a monolithic apparatus.

2. The apparatus of claim 1, wherein the first direction is substantially parallel to the plane.

3. The apparatus of claim 1, wherein the first direction is substantially perpendicular to the second direction.

4. The apparatus of claim 1, wherein the filtering material is a first filtering material, and wherein the filtering component further comprises a second filtering material.

5. The apparatus of claim 4, wherein the second filtering material is positioned adjacent to the first filtering material.

6. The apparatus of claim 4, wherein the second filtering material is positioned substantially parallel to the first filtering material.

7. The apparatus of claim 1, wherein the first connecting component includes a first contacting surface and the second connecting component includes a second contacting surface, and wherein the first contacting surface is in direct contact with the second contacting surface.

8. The apparatus of claim 7, wherein the first contact surface is substantially parallel to the first plane.

9. The apparatus of claim 7, wherein the second contact surface is substantially parallel to the first plane.

10. The apparatus of claim 7, wherein the first contact surface is substantially perpendicular to the first plane.

11. The apparatus of claim 7, wherein the second contact surface is substantially perpendicular to the first plane.

12. The apparatus of claim 1, wherein the first connecting component includes a weld.

13. The apparatus of claim 1, wherein the second connecting component includes a weld.

14. An apparatus for sealing and filtering a fluid wherein the fluid comprises at least one of a gas or a liquid, the apparatus comprising:
 a metallic seal component having an annular structure and, the annular structure including a sidewall defining a recess, the metallic seal component having opposed seal arms extending radially from the recess wherein the opposed seal arms comprise surfaces configured to form seal interfaces with corresponding joint surfaces, the metallic seal having a first height between the opposed seal surfaces;
 a first connector component coupled to and extending from the metallic seal in at least a first direction, the first connector component coupled to the metallic seal component at approximately a midpoint between the opposed seal surfaces;
 a filter component having a filter material extending substantially along a plane generally orthogonal to a flow path of the fluid, the filter material being configured to filter fluid passing therein in a second direction, the filter component having a second height wherein the second height is less than the first height; and
 a second connector component coupled to the filter component and configured to be coupled to the first connector component, the second connecting component extending in a second direction to overlap, in part, with the first connecting component;

wherein the seal component and the filter component form a monolithic apparatus via the coupling of the first connector component and the second connector component.

15. The apparatus of claim 14 wherein the first connector component forms a leg integral with the metallic seal component and the second connector component forms a ledge integral with the filter component.

16. An apparatus for sealing and filtering a fluid wherein the fluid comprises at least one of a gas or a liquid, the apparatus comprising:
 a metallic seal component having an annular structure and, the annular structure including a sidewall defining a recess, the metallic seal component having opposed seal surfaces configured to form seal interfaces with corresponding joint surfaces, the metallic seal having a first height between the opposed seal surfaces; wherein wherein metallic seal component comprises: an annular base having a first end and a second end; a first edge leg coupled to the first end of the annular base, wherein the first edge leg terminates in a protrusion; and a second edge leg coupled to the second end of the annular base, wherein the second edge leg terminates in a protrusion, wherein the opposed seal surfaces are formed on the protrusions
 a first connector component coupled to and extending from the metallic seal in at least a first direction, the first connector component coupled to the metallic seal component at approximately a midpoint between the opposed seal surfaces;
 a filter component having a filter material extending substantially along a plane generally orthogonal to a flow path of the fluid, the filter material being configured to filter fluid passing therein in a second direction, the filter component having a second height wherein the second height is less than the first height; and
 a second connector component coupled to the filter component and configured to be coupled to the first connector component;
 wherein the seal component and the filter component form a monolithic apparatus via the coupling of the first connector component and the second connector component.

17. The apparatus of claim 14 wherein the filter component comprises a metal support coupled to the filter component.

18. The apparatus of claim 17 wherein the filter component comprises an upstream filter material coupled to the metal support and a downstream filter material coupled to the metal support.

19. The apparatus of claim 17 wherein the metal support comprises a plate with a plurality of perforations.

* * * * *